(12) United States Patent
Klausberger et al.

(10) Patent No.: US 7,729,376 B2
(45) Date of Patent: Jun. 1, 2010

(54) METHOD FOR IMPROVING QUALITY-OF-SERVICE MANAGEMENT IN NETWORKS

(75) Inventors: Wolfgang Klausberger, Hannover (DE); Meinolf Blawat, Hannover (DE); Stefan Kubsch, Hohnhorst (DE); Hui Li, Hannover (DE); Dietmar Hepper, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1113 days.

(21) Appl. No.: 11/215,554

(22) Filed: Aug. 30, 2005

(65) Prior Publication Data

US 2006/0045100 A1 Mar. 2, 2006

(30) Foreign Application Priority Data

Sep. 2, 2004 (EP) .................................. 04090339

(51) Int. Cl.
*H04J 3/22* (2006.01)
(52) U.S. Cl. ...................................... 370/468; 370/400
(58) Field of Classification Search ................. 370/400, 370/432, 233, 252, 253, 260, 468; 709/227, 709/234
See application file for complete search history.

(56) References Cited

U.S. PATENT DOCUMENTS

| | | | | |
|---|---|---|---|---|
| 6,104,705 A | * | 8/2000 | Ismail et al. | 370/260 |
| 7,110,366 B2 | * | 9/2006 | Hulyalkar et al. | 370/252 |
| 7,415,477 B2 | * | 8/2008 | Devadas et al. | 707/101 |
| 2001/0045914 A1 | * | 11/2001 | Bunker | 343/895 |
| 2002/0194321 A1 | * | 12/2002 | Yaseen et al. | 709/223 |
| 2003/0076848 A1 | * | 4/2003 | Bremler-Barr et al. | 370/412 |
| 2005/0132062 A1 | * | 6/2005 | Halme | 709/227 |
| 2006/0239363 A1 | * | 10/2006 | Blakeney et al. | 375/259 |

FOREIGN PATENT DOCUMENTS

EP 1 229 442 A2 8/2002

OTHER PUBLICATIONS

King M et al. "Transforming the reliability, security and scalability of it communiciations through the pervasive deployment of serverless software infrastructure" Second Int. Conf. on Peer-to-Peer Computing Sep. 5, 2002 pp. 5-12, Chapters "Peer Management" and "Overlay Networks".

(Continued)

*Primary Examiner*—Dang T Ton
*Assistant Examiner*—Mandish Randhawa
(74) *Attorney, Agent, or Firm*—Robert D. Shedd; Joseph J. Opalach; Jerome G. Schaefer

(57) ABSTRACT

A logical quality-of-service management method for peer-to-peer networks uses a special group service for QoS management within peer-groups. This group service determines and assigns a budget per time unit for each peer. Such time unit may be in the range of milliseconds or few seconds. It may also determine a group budget for the peer-group. While a peer uses bandwidth, i.e. while it sends or receives data, its budget is decreased. When a peer has exhausted its budget, it has to lower its priority for transferring or receiving data. Each peer is responsible for keeping its own budget. If a peer does not keep the conditions, other peers may have the right to deny the data transfer from that peer. The QoS service function is advertised in peer-group advertisement messages.

10 Claims, 2 Drawing Sheets

OTHER PUBLICATIONS

Tao Zhad et al. "Enforcing resource sharing agreements among distributed server clusters" Parallel and Distributed Processing Symposium, Proceedings International, IPDPS 2002, Abstracts & CD ROM Ft. Lauderdale, FL USA Apr. 15-19, 2002, Los Alamitos, CA USA IEEE Comput. Soc., US Apr. 15, 2002 pp. 214-223.

Zhi-Bing Li et al, "The Security Study of QoS Mechanism in Internet", Journal of Beijing University of Posts and Telecommunications, vol. 26, Jun. 2003, Section 2, pp. 813-816 and Figures 2 and 3. Zheng-Wu Zhou et al, "Research on a Transmission Control Algorithm of the Real-Time Video Stream AVTC over IP Network", vol. 41, No. 5, May 2004, Section 3, pp. 79-80.

* cited by examiner

METHOD FOR IMPROVING QUALITY-OF-SERVICE MANAGEMENT IN NETWORKS

FIELD OF THE INVENTION

This invention relates to a method for controlling data traffic within a group of cooperating network nodes. In particular, the invention relates to a method for improving quality-of-service management in networks.

BACKGROUND

Networks of connected devices for exchanging data and sharing hardware resources can be built up not only for computers but also for consumer electronic devices. The separate devices are called nodes of the network. Networks can be classified as being based on either client-server or peer-to-peer (P2P) architectures, where a node is also referred to as a peer. While in client-server architectures each node is defined to be either client or server, peers in P2P networks include both functionalities, server and client, and can provide services or resources to other nodes in the network or use services or resources provided by other nodes in the network.

P2P networks are usually not restricted to any special applications or underlying network topologies, but can be understood as a set of nodes, or peers, which rely on certain sets of specific protocols. It is characteristic for a P2P network that the peers communicate directly with other peers, so that no central network organization is required. P2P networks may support that peers can be connected to the network or disconnected from the network at any time.

The mentioned P2P protocols are required for basic network organization, such as e.g. discovery of other connected peers, offering of services or resources to other peers (advertising), or understanding other peers' advertising messages. Also, there are protocols that enable a group of peers to cooperate, and thus form a peer-group. A method for building a home network as a peer-group based on such P2P techniques is described e.g. in the European patent application EP02027122. General P2P networks and mechanisms are in a detailed manner published e.g. in WO 02/057917.

Quality of Service (QoS) is a networking term specifying the characteristics and quality of a connection between two distinct points in a network, e.g. a guaranteed throughput level being the amount of data transferred from one place to another in a specified amount of time, a minimum bandwidth or a maximum delay of transmitted data. Usually various QoS classes are defined and network connections are categorized by the QoS class they may provide. Different network infrastructures utilize different strategies and protocols. E.g. the IEEE 1394 protocol is developed for audio-visual (AV) data handling with guaranteed throughput, while e.g. the Ethernet network uses a simple "best effort" approach. To achieve QoS functionality in Ethernet networks there exist models like assigning priorities or allocating network resources for a data transfer.

However, the known QoS strategies require special knowledge of the currently used physical network. Currently known QoS management approaches for home networks require considering QoS at all layers, also at the network layer.

SUMMARY OF THE INVENTION

It is desirable that the requirement for P2P systems to be independent of the underlying physical network topology is also valid for the QoS within peer-groups, even when the underlying network does not guarantee a specific QoS. A QoS management system according to the present invention may work on top of the underlying network, and on account of this is independent of the underlying network. It can therefore be regarded as a logical QoS management system. Thus, applying the inventive method on any physical network will improve the QoS functionality.

According to the invention, a special group service for QoS management within peer-groups is installed. This group service determines and assigns a "budget" per specific time unit for each peer. Such time unit may be in the range of milliseconds or few seconds, or even more. While a peer uses bandwidth, i.e. while it sends or receives data, its budget decreases. When a peer has exhausted its budget, it has to lower its priority for transferring or receiving data until its budget is refilled, or until other peers' budgets are lower. If a peer does not keep the conditions, the QoS service tries to manage the load with the concerned peers. If an agreement between the peers is not achievable, e.g. all peers have the same priority and budget, the QoS service may inform the user which peer overloads the network. Then the user has the choice how to proceed, e.g. change priorities for certain peers.

In particular, the inventive method for controlling data traffic within a group of cooperating network nodes, with at least one service function being available as a "group service" for the nodes of the group, includes the following steps:

First said service function, named e.g. "QoS service", assigns individual numerical values as "budget" to the individual nodes of the group.

Then the individual budgets or numerical values are transmitted to the respective network nodes, which store their numerical budget value.

In the next step, a network node that intends to send or receive data checks whether its stored numerical value is above a threshold, and upon determining that this is the case it determines or calculates from the numerical value a data rate value, wherein the determined data rate value depends on the numerical value, i.e. the data rate value is the higher the higher the numerical value is. This means that a node's remaining budget value is a measure for the bandwidth the node may allocate, or for the amount of data it may send or receive before the budget is refilled; e.g. the node may allocate more bandwidth as long as its budget value is high, and lower its data rate while its budget decreases, so that it can send and/or receive continuously. Another possibility for the node is to just allocate the bandwidth it needs as long as the budget is positive, regardless of the actual budget value. In this case it may have to interrupt its transfer when its budget is empty, or request an exception from the service function.

As the next step, the network node decreases the stored budget values while sending or receiving data at the determined data rate, in order to keep track of its budget. Therefore it stores the decreased numerical value, for repeating the steps of determining from the current value a data rate, sending/receiving data at the determined rate and decreasing the budget correspondingly, until the budget is refilled. The refilling may preferably be done in regular time intervals, or e.g. when the total budget of all nodes of the group is below a threshold.

The inventive method can be extended by the following steps: When the network node has determined a data rate value from its current budget value, it may send a message to the QoS service function containing this data rate value and further containing a request for data transmission or reception, or bandwidth allocation in general. Then the QoS service function sends a message with an agreeing or disagreeing statement back to the node. This message may also contain an admissible data rate for the node, wherein the network node may only transmit or receive data upon an agreeing statement from the first service function. This means that the Qos service function may reduce or increase, and thus control, the bandwidth that a node uses.

For determining budget values it may evaluate the current traffic situation on the network as follows:

First, the QoS service function monitors during a specified time the data rate that the nodes of the group use, and accumulates the monitored data rates in order to find the total workload on the network. Then it determines from the accumulated data rates a value representing a group budget, and determines from the group budget individual numerical values for the network nodes.

An apparatus being a network node or component thereof that utilizes the inventive method is disclosed in claim 10.

Such apparatus may be a network node being capable of cooperating with other network nodes as a group of nodes, wherein at least one service function is available for said nodes within the group, including interface means for receiving from a first service function an individual numerical value;

storage means for storing the received individual numerical value;

means for determining that the stored numerical value is above a threshold;

calculation means, for determining from the numerical value a data rate value, wherein the determined data rate value is the higher the higher the numerical value is;

control means for modifying the data rate of said interface means to meet the determined data rate;

calculation means for decreasing the stored numerical value; and storage means for storing the decreased numerical value.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a virtual network on top of an Ethernet based physical network.

DETAILED DESCRIPTION OF THE INVENTION

Figure 1:
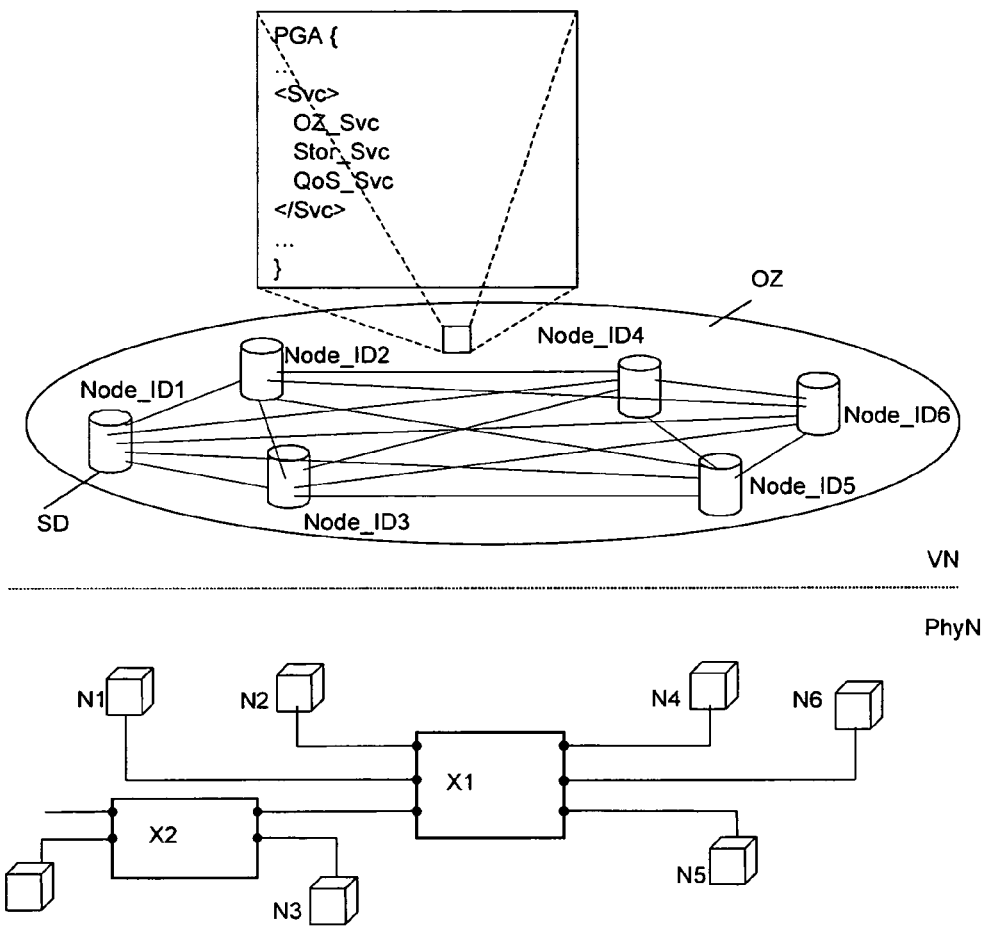

FIG. 1 depicts a logical or virtual network VN being a kind of network overlay on top of a physical network Phy_N, e.g. a switched Ethernet network. The physical nodes N1, . . . , N6 have on a logical level individual identifiers Node_ID1, . . . , Node_ID6 and form a peer-group, which may in particular be e.g. an "Owner Zone" OZ as described in the European patent application EP02027122. This means that its member peers have a common group identifier and may communicate with each other, but not with other peers. Further, they may use e.g. the JXTA protocol set described in WO02/057917. The invention may also be applied to other network types where common services are used. The following description refers to OwnerZones as well as to peer-groups in general.

Peer-groups use peer-group advertisement (PGA) messages to distribute information about the services Svc that are available within the peer-group. These are exemplarily an OwnerZone service OZ_Svc for administrative tasks relating generally to the peer-group as such, a storage service Stor_Svc for managing distributed storage within the peer-group, and a Quality-of-Service service QoS_Svc according to the invention. The PGA messages containing the list of services are published within the peer-group so that all member peers get knowledge about available services, and how to access them.

The inventive method or service for QoS management within the OZ, or more generally within a peer-group, determines, assigns and supervises a budget per defined time unit for each peer of the OZ or peer-group.

First, the QoS service QoS_Svc determines the budget of the peer-group. This can be achieved by monitoring and metering the data transport within the peer-group. E.g. round-trip times (RTTs) for special sequences of test packets are measured, preferably when the OZ is idle and traffic is low. RTTs can however also be measured in parallel to running transfers. For RTT measurement, dedicated test packets are sent to a receiver, which sends the packets back, and the reply time is measured. The measured reply time serves as a basis for estimating an "expected" period. If the reply does not come within the expected period, the packet is assumed to be lost and the data is retransmitted.

E.g. the following criteria can be used for determining the maximum transfer budget within the OwnerZone:

1. Delay of data packets. For a certain guaranteed QoS level the delay of data packets may not exceed a predefined threshold.
2. Loss of data packets. For a certain guaranteed QoS level the loss rate of data packets may not exceed a predefined threshold.

For RTT measurements, the QoS service increases transfer rates between peers until one of the criteria is reached, so that the maximum budget for all connections between the peers in the peer-group can be estimated. The QoS service comprises a strategy to distribute RTT measurements to several peers in parallel to evaluate a realistic maximum budget that will neither overload nor "underload" the network, i.e. prevent congested and idle states.

As an example for the estimation of the maximum peer-group budget, a peer-group may consist of 100 peers, and the packet delay threshold will be reached at 90 Mb/s, e.g. by 3 connections at 30 Mb/s. Then the budget per peer is $$90 \text{ Mb/s}/100 \text{ peers}*TU = 0.9 \text{ Mb/s}*TU$$

where TU is a time unit, e.g. 1 hour.

Together with this estimation, the value for the maximum transfer rate for one P2P connection and for a simultaneous data transfer for several P2P connections can be estimated and maintained in a list. The list is part of the QoS service. The QoS service assigns a part of the budget to each peer, so that the peers receive their budget value from the QoS service. This may be e.g. the current value on a regular basis, an initial value and a drop rate, or similar. When a peer initiates a transfer, it may send a message with the transfer characteristics to the QoS service. In one embodiment of the invention, a peer sends such message for each transfer. Thus, the QoS service is able to approve, control and manage data transfers within the peer-group or OZ, wherein generally each peer is responsible to keep it's own budget. The QoS service may control priorities of different network nodes, and thus smooth the traffic situation by delaying or preventing packets.

In the course of time, the QoS service may refine the strategy to determine the maximum budget of the peer-group and the maximum transfer rate. This can be done e.g. by determining the maximum budget by different combinations of peer-to-peer connections, maintaining a history list of RTT measurements or finding bottlenecks of the underlying network.

When a peer tries to exceed its budget, i.e. transmit or receive data although its budget is exhausted or empty, it may request additional budget from the QoS service, and the QoS service having an overview over current data traffic may agree e.g. if the network load is currently low. When the QoS service observes a traffic overload in the network, it tries to manage the load with the concerned peers, i.e. the sending, receiving and waiting peers. If a load agreement between the peers is not achievable, the QoS service may inform the user about which peer overloads the network. The user will then have the choice how to proceed, or can set priorities: For instance, stop one of the transfers and resume it later, or switch a particular transfer to a lower transfer rate, e.g. for media rendering, playback in SDTV instead of HDTV or the like. In case of a normal playback the media rendering may be performed automatically in order to save budget.

With these measurements, the QoS service can get some knowledge about the topology of the network. If the QoS service discovers peers that have a restricted bandwidth connection, it will be more efficient for the whole OZ to assign a lower budget to these peers by lowering their weight or priority. The QoS service may assign a priority to a peer. So peers with faster connections have a higher budget available.

The QoS service determines the budget of the peer-group and assigns a part of the budget as initial value for each peer. More important peers with a higher priority may get a higher budget. Moreover, the user may influence how much budget a peer gets, e.g. by assigning a priority to a peer or a connection, which can then be used by the QoS service to determine the budget. The priority of a peer decreases within time while it uses bandwidth, i.e. the more of its budget a peer has spent per defined time unit, the less is its priority compared to other peers. The budget of the peer may be refilled after the defined time unit. The defined time unit may elapse for all peers simultaneously, or individually for each peer or groups of peers. Alternatively, the budgets may be refilled when a certain amount of data have been transferred within the peer-group, i.e. the sum of the node budgets within the group is below a threshold value.

Figure 2:
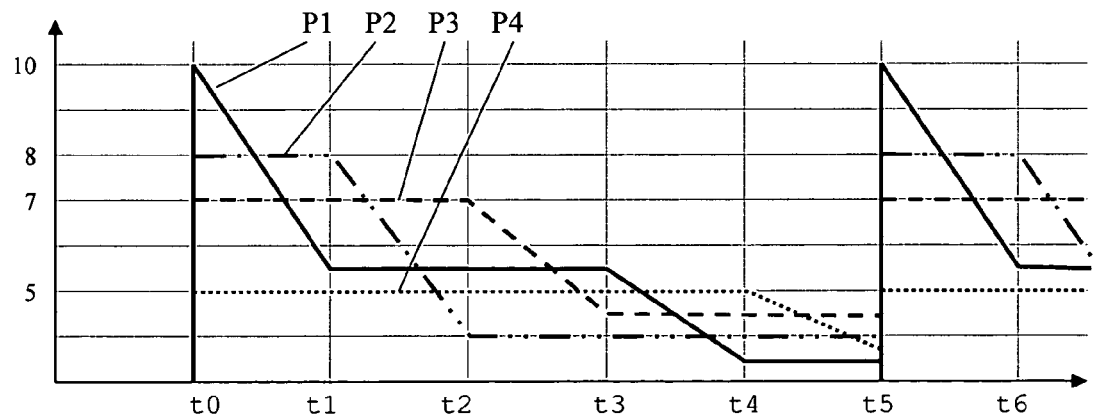
FIG. 2 priorities or budgets assigned to peers.

FIG. 2 shows in a simplified manner how the budget of different peers may be changed in time. At a time t0, the QoS service assigns to four peers P1, . . . , P4 individual budgets. The peers P1, . . . , P4 get budgets of 10, 8, 7 and 5 respectively. A budget value can also be understood as a kind of priority value. The reduction of budget during transfer can be understood as "transfer cost". In the example in FIG. 2, one peer P1 starts transferring data at t0, and thus uses bandwidth in the network. While it transfers data, its budget is decreasing. After a while, at t1, a second peer P2 starts a transfer and sends a message to the QoS service to request bandwidth, the QoS service recalculates or evaluates the current budgets and detects in this example a network overload, and that the second peer P2 has a higher budget than the first peer P1. Thus, the first peer P1 must in this example reduce its transfer rate at t1, so that its budget decreases slower or remains constant, and the second peer P2 may transfer data. The QoS service may control this through sending messages. After another while, at t2, a third peer P3 has data to transmit and has the highest budget and may therefore transfer data. Later, at t3, the first peer P1 may continue transferring data because it has at that moment the highest remaining budget, and at t4 a fourth peer P4 may transfer data. A defined time after the previous budget assignment, at t5, all peers get new budgets defined, and the cycle may be repeated.

Though the described embodiment shown in FIG. 2 shows the main effect of the invention in principle, it is however simplified in the following manners:

While in FIG. 2 only one peer at a particular time occupies bandwidth, it will usually be the case that two or more peers share the available bandwidth, and the QoS service determines upon priority or budget which share a peer gets. In case of a non-overloaded network, i.e. all priorities can be served, the order of serving requests may depend on a node's budget so that the budget can be seen as the only priority value. When the QoS-service determines an overload of the network and no self-organised solution for bandwidth reduction is achievable, the QoS-service decides upon a peer's budget how much bandwidth it gets. In particular, if two peers have the same priority then the QoS service will decide, depending on the remaining budgets of the peers, which share of the available bandwidth each peer gets.

While in FIG. 2 only the budget of a transmitting peer is reduced, it is also possible to reduce the budget of the receiving peer, or both may share the "transfer costs". Further it is possible that the peer that has caused or initiated a transfer is not involved in the transfer itself. In this case it is also possible to charge the budget of the causing peer.

While in FIG. 2 all peers have a fixed value to which they get their respective budgets refilled, it is possible to recalculate budgets at any time, and at the next refilling cycle assigning modified budgets to the peers.

Further, while in FIG. 2 all peers get their budgets assigned simultaneously, the QoS service may assign budgets at individual times to different peers.

While in FIG. 2 the budget of a peer drops linearly during a time increment, it may also drop in a non-linear manner according to the data rate it momentarily uses.

While in FIG. 2 the remaining budget of a peer is ignored for refilling, it is alternatively possible to accumulate the assigned new budget value and the remaining budget, so that also peers with low budgets can gather high priority. Time increments may be defined that may be very short, e.g. few milliseconds or microseconds or the typical transmittal time of a packet in the network, and the number of increments between re-assigning budgets may be very high, e.g. in the range of tens of thousands or even more. Moreover, the time between re-assigning budgets to peers need not be constant. Instead, the QoS service may observe the current budget development, accumulate all the budgets that the peers have available and assign new budgets only when the accumulated sum is below a threshold.

Further, in one embodiment of the invention a peer must explicitly request bandwidth before it may transfer data, and in the request it points out a required data rate and/or amount of data. Then the QoS service will, according to the current network traffic situation, assign a certain priority for the particular transfer. When a peer tries to transfer a huge amount of data in a short time, i.e. with a very high data rate, this transfer could block any other transfer. To prevent this, the maximum transfer rate for a single peer-to-peer connection may be restricted by an upper limit, which may be e.g. the transfer rate for a high definition video transfer. When a peer wants to allocate a higher data rate, the priority for that transfer may be lowered.

In one embodiment of the invention, the budget of a peer remains constant during the transfer, and is charged with the transfer costs after the transfer is finished, so that running transfers are not interrupted even if the budget of the node is empty.

When the budget of a peer is exhausted, the corresponding peer has to reduce its activity for the benefit of other peers with a higher budget. Regulatory measures may be foreseen for the case that a peer does not keep the conditions, e.g. other peers may deny the data transfer to and from that peer by delaying acknowledgement messages or the like. Running transfers may be allowed to finish, or may be terminated by a time-out. This can keep the network running also when a peer is not cooperative as a consequence of an error. As a penalty, the QoS service can assign a lower budget to that peer. When a peer continues to break the conditions, the QoS service can request the user to disconnect the peer from the network, in order to maintain an efficiently working peer-group.

Figure 3:
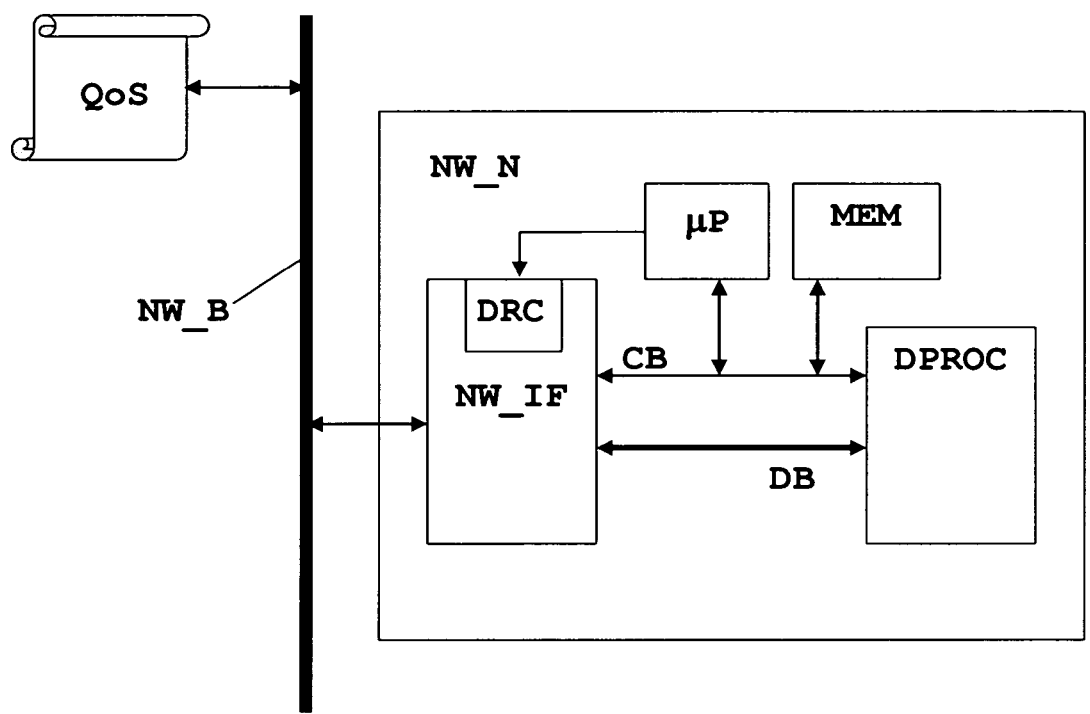
FIG. 3 a network node containing a budget dependent data rate control.

A device according to the invention is shown in FIG. 3. It is a network node NW_N or component thereof which may be connected e.g. via a network bus NW_B to a service function QoS that performs quality-of-service management. The network node NW_N contains a network interface NW_IF, a processing unit μP, a memory unit MEM and a data processing unit DPROC, which may all communicate with each other via an internal communication bus CB. Further, the network interface NW_IF may send or receive data to or from the data processing unit DPROC via an internal data bus DB, which is usually a high-capacity bus. To implement the present invention, the network interface unit NW_IF contains a data rate controller DRC that is connected to the processing unit μP.

The network interface NW_IF receives from the service function QoS a message that contains a budget value for the network node NW_N. The processing unit μP evaluates the message, extracts the budget value and stores it in a memory MEM, which may also be within the processing unit to that it is easily accessible. Then the processing unit calculates from the budget value a data rate value, which it may transmit to the data rate control unit DRC of the network interface NW_IF. It may however also evaluate the value itself, and in a simple embodiment control the data rate of the network interface NW_IF by enabling or disabling it depending on the remaining budget, so that the data rate control unit DRC is an enable switch of the network interface. In a more sophisticated embodiment, the data rate control unit DRC receives a target data rate value from the processing unit and adjusts the actual data rate of the network interface to meet the target data rate.

The QoS service determines the priority of a transfer, e.g. depending on the node and the data type; a node provides data type information when it requests bandwidth. Therefore not necessarily the node with the highest budget must be preferred. The budget is mainly a means for the self-organization of the peer. When two peers with same priority transfer data with the same priority, the QoS service may enforce or restrain each of them according to their budgets e.g. assign more or less bandwidth.

The peer-group may be a dynamic system where peers may join and leave arbitrarily, like e.g. in an OwnerZone. The QoS service may keep a part of the budget as a reserve for new joining peers, or it may reassign the budget for each peer when a new peer joins the peer-group. Keeping a reserve is advantageous for peer-groups where peers enter and leave very often, e.g. when peers are mobile devices.

Advantageously, the logical "quality of service" management system according to the invention is independent of the underlying physical network. When the invention is utilized e.g. in a peer-group being an OwnerZone, the peer-group may adaptively control its data transfer performance by processing the described metering and monitoring, and may instruct the peers concerning their cooperative behaviour by controlling their budgets.

It is particularly advantageous to use the invention for multimedia home networks that include electronic storage devices and are based on peer-to-peer technology. The peer-group or OwnerZone may implement e.g. a distributed storage system. The invention can however also be used in other types of peer-groups.

What is claimed is:

1. A method for controlling data traffic within a group of cooperating network nodes, where at least one service function is-available for said nodes within the group, the method including the steps of:
   assigning, through a first service function of the at least one service function, individual numerical values to individual nodes of the group;
   transmitting to the network nodes their respective individual numerical values;
   storing in the network nodes their assigned individual numerical values;
   a network node determining that its stored numerical value is above a threshold and determining from the numerical value a data rate value, wherein the determined data rate value is higher for greater numerical values;
   the network node sending or receiving data at the determined data rate; and
   the network node decreasing the stored numerical value and storing the decreased numerical value, where a bandwidth is reduced by the node according to the decreased numerical value, and wherein decreasing the stored numerical value and reducing the bandwidth are repeated until a plurality of nodes of the group of cooperating network nodes has sent or received data and the first service function assigns a new individual numerical value to the network node.

2. The method according to claim 1, further including the steps of:
   the network node sending a message, to the first service function containing the determined data rate, a request for data transmission or reception and data type information;
   the first service function sending back a message to the node containing an agreeing or disagreeing statement, or an admissible data rate for the node, wherein the network node may only transmit or receive data upon an agreeing statement from the first service function.

3. The method according to claim 1, further including the steps of:
   monitoring by the first service function during a specified time the data rate that the nodes of the group use;
   accumulating said monitored data rates;
   determining from the accumulated data rates a value representing a group budget, and determining from the group budget individual numerical values for the network nodes.

4. The method according to claim 1, further including the steps of:
   measuring round-trip-times for network connections between said nodes, wherein a round-trip-time is the time between sending a packet from a first to a second node and receiving an answer from the second node at the first node, or detecting that no answer was received after a specified time;
   determining from the measured round-trip-times a value representing a group budget, and determining from the group budget individual numerical values for the network nodes.

5. The method according to claim 4, wherein a part of the group budget is not assigned to the network nodes, but reserved for new nodes joining the group.

6. The method according to claim 1, wherein said first service function determines a budget for the group and/or reassigns individual numerical values to the nodes in defined regular time intervals.

7. The method according to claim 1, wherein the network nodes add their respectively assigned individual numerical value to their individual remaining numerical value from the previous assignment, and store the sum.

8. The method according to claim 2, wherein the service function accumulates the data rates of the nodes and determines a budget for the group and/or assigns the individual numerical values to the nodes when the accumulated data rates are above a threshold.

9. The method according to claim 1, wherein the network nodes are peers in a peer-to-peer network.

10. A network node being capable of cooperating with other network nodes as a group of nodes, where at least one service function is available for said nodes within the group, the network node including:

interface means for receiving from a first service function of the at least one service function an individual numerical value;

means for storing the received individual numerical value;

means for determining that the stored numerical value is above a threshold;

means for determining from the numerical value a data rate value, wherein the determined data rate value is higher for greater numerical values;

means for modifying the data rate of said interface means to meet the determined data rate;

means for decreasing the stored numerical value, wherein the data rate value is reduced according to the decreased numerical value; and means for storing the decreased numerical value, wherein the means for decreasing the stored numerical value operates repeatedly and the means for modifying the data rate repeatedly reduces node bandwidth until a plurality of the other network nodes of the group of nodes has sent or received data and said interface means receives from the first service function a new numerical value.

* * * * *